United States Patent
Li et al.

(10) Patent No.: US 9,247,390 B2
(45) Date of Patent: *Jan. 26, 2016

(54) METHOD AND SYSTEM FOR PROVIDING LOCATION AWARE TRACKING AND SERVICES VIA AN IP MULTIMEDIA RESIDENTIAL GATEWAY

(71) Applicant: Broadcom Corporation, Irvine, CA (US)

(72) Inventors: Gordon Yong Li, San Diego, CA (US); Xuemin Chen, Rancho Santa Fe, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/458,762

(22) Filed: Aug. 13, 2014

(65) Prior Publication Data

US 2014/0349687 A1 Nov. 27, 2014

Related U.S. Application Data

(63) Continuation of application No. 12/837,052, filed on Jul. 15, 2010, now Pat. No. 8,839,328.

(51) Int. Cl.
*H04N 7/173* (2011.01)
*H04W 4/02* (2009.01)
(Continued)

(52) U.S. Cl.
CPC ........... *H04W 4/023* (2013.01); *H04L 65/1026* (2013.01); *H04L 65/1036* (2013.01);
(Continued)

(58) Field of Classification Search
USPC .................. 725/110; 709/217, 225, 228–230
See application file for complete search history.

(56) References Cited

U.S. PATENT DOCUMENTS 7,131,135 B1   10/2006  Virag et al.
7,886,318 B2 *  2/2011  Wang et al. .............. 725/25
(Continued)

FOREIGN PATENT DOCUMENTS

EP   2408173 A1    1/2012
WO   WO-99/51038 A2   10/1999
WO   WO-03/075125 A2   9/2003

OTHER PUBLICATIONS

Steiniger, Stefan, et al., "Foundations of LBS," Cartouche, Aug. 6, 2008, pp. 1-49, retrieved from www.e-cartouche.ch/content_reg/cartouche/LBSbasics/en/text/LBSbasics.pdf.
(Continued)

*Primary Examiner* — Pankaj Kumar
*Assistant Examiner* — Charles N Hicks
(74) *Attorney, Agent, or Firm* — Foley & Lardner LLP; Christopher J. McKenna; Paul M. H. Pua

(57) ABSTRACT

In an IP multimedia gateway, locations corresponding to communicatively coupled communication devices are determined and transmitted to a service provider device (SPD) that provides services to the communication devices. Communication devices receive location based service profiles from the (SPD) based on the determined locations. Services content from the (SPD) is communicated with the communication devices and/or with the (SPD), based on the profiles. The determined locations are received from communication devices which may be local or remote. A device location map is generated to be displayed by communication devices. The gateway may be integrated in an STB/DTV that displays the determined locations. Content is communicated to communication devices based on their location. The (SPD) may provide content and/or control information for communication device services. Locations are associated with client devices for detecting cloned client devices where determined locations are different than associated locations and/or for restricting services based on location.

20 Claims, 5 Drawing Sheets

(51) Int. Cl.
  *H04N 21/258* (2011.01)
  *H04L 29/06* (2006.01)
  *H04L 29/08* (2006.01)
  *H04M 7/00* (2006.01)
  *H04M 3/42* (2006.01)

(52) U.S. Cl.
  CPC ............ *H04L65/1063* (2013.01); *H04L 67/18* (2013.01); *H04L 67/303* (2013.01); *H04M 7/0069* (2013.01); *H04N 21/25816* (2013.01); *H04N 21/25841* (2013.01); *H04N 21/25875* (2013.01); *H04M 3/42348* (2013.01)

(56) References Cited

U.S. PATENT DOCUMENTS

| | | | |
|---|---|---|---|
| 8,839,328 | B2 * | 9/2014 | Li et al. .................. 725/110 |
| 2005/0239440 | A1 | 10/2005 | Chen et al. |
| 2007/0005419 | A1 * | 1/2007 | Horvitz et al. .................. 705/14 |
| 2008/0285544 | A1 | 11/2008 | Qiu et al. |
| 2008/0320543 | A1 | 12/2008 | Wang et al. |
| 2009/0005021 | A1 | 1/2009 | Forstall et al. |
| 2010/0125865 | A1 | 5/2010 | Ospalik et al. |
| 2010/0146541 | A1 | 6/2010 | Velazquez |
| 2011/0088074 | A1 | 4/2011 | Harp et al. |

OTHER PUBLICATIONS

Bartolomeo, et al., "The Simplicity project and Its Demonstrator: Improving Ease of Use and Personalization of ICT Services," Global Telecommunications Conference, 2006, IEEE, Nov. 1, 2006, pp. 1-6.
European Search Report in co-pending related EP Application No. 13003871.4, mailed Nov. 21, 2013.
European Office Action for 11 005 600.9, mailed Mar. 4, 2013.
Notice of Allowance for U.S. Appl. No. 12/837,052, mailed May 6, 2014.
Final Office Action for U.S. Appl. No. 12/837,052, mailed Jul. 17, 2012.
Final Office Action for U.S. Appl. No. 12/837,052, mailed Aug. 7, 2013.
Non-Final Office Action for U.S. Appl. No. 12/837,052, mailed Feb. 1, 2012.
Non-Final Office Action for U.S. Appl. No. 12/837,052, mailed Feb. 6, 2013.
International Search Report for PCT/US2003/06169, mailed Oct. 27, 2003.
International Search Report for PCT/US1999/06943, mailed Jun. 6, 2000.
Office Action for Chinese Patent Application No. 2011101991690 mailed Jan. 12, 2015 (including English summary).
Office Action for Taiwan Patent Application No. 100124883 mailed Jul. 16, 2015 (including English summary).

* cited by examiner

METHOD AND SYSTEM FOR PROVIDING LOCATION AWARE TRACKING AND SERVICES VIA AN IP MULTIMEDIA RESIDENTIAL GATEWAY

CROSS-REFERENCE TO RELATED APPLICATIONS/INCORPORATION BY REFERENCE

This application is a continuation of and claims priority to and the benefit of U.S. patent application Ser. No. 12/837,052, filed Jul. 15, 2010, the entire contents of which are incorporated herein by reference for all purposes.

U.S. patent application Ser. No. 12/829,145, which was filed on Jul. 1, 2010;

U.S. patent application Ser. No. 12/829,179, which was filed on Jul. 1, 2010;

U.S. patent application Ser. No. 12/829,212, which was filed on Jul. 1, 2010; and U.S. patent application Ser. No. 12/837,089, which was filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to providing location aware tracking and services via an IP multimedia residential gateway.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transports real-time data such as audio and video data. RTP does not exclusively guarantee real-time delivery of data, but it does provide mechanisms for the sending and receiving applications to support streaming data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing location aware tracking and services via an IP multimedia residential gateway.

Various advantages, aspects and novel features of the present invention, as well as details of an illustrated embodiment thereof, will be more fully understood from the following description and drawings.

DETAILED DESCRIPTION OF THE INVENTION

Figure 1:
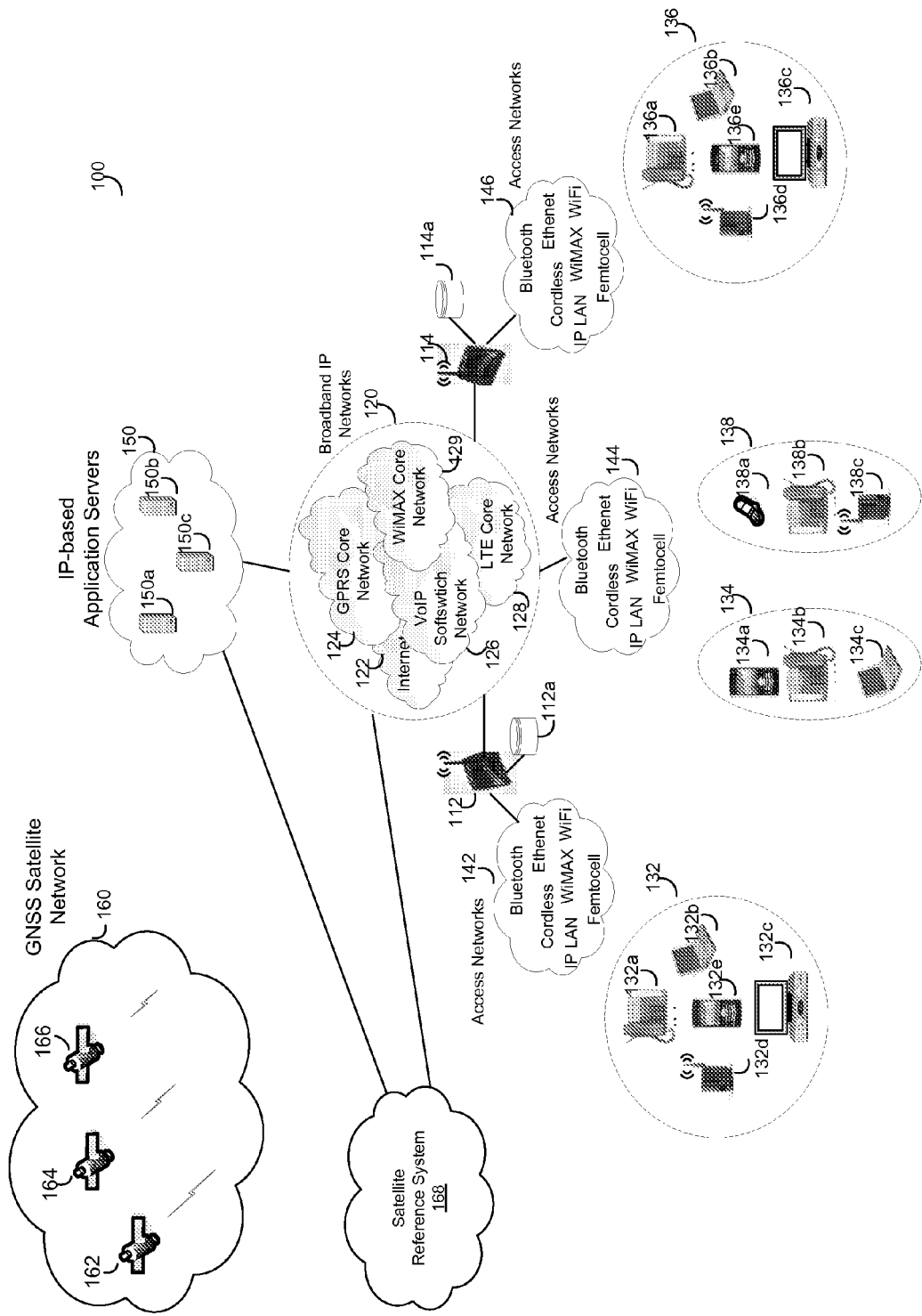
FIG. 1 is a diagram illustrating an exemplary communication system comprising an IP multimedia residential gateway (IMRG) that is operable to perform location aware tracking and services, in accordance with an embodiment of the invention.

Certain embodiments of the invention can be found in a method and system for providing location aware tracking and services via an IP multimedia residential gateway (IMRG). In accordance with various embodiments of the invention, in an IP multimedia gateway, a location corresponding with one or more of a plurality of communication devices that are communicatively coupled to the IP multimedia gateway may be determined. The determined corresponding location may be transmitted to one or more service provider devices that are operable to provide services to one or more of the plurality of communication devices. Location based service profiles may be received from the one or more service provider devices. The received location based service profiles may be generated by one or more service provider devices based on the determined corresponding location. Content for services provided by the one or more service provider devices may be communicated with the one or more of the plurality of communication devices and/or with the one or more service provider devices based on the received location based service profiles.

The corresponding location for one or more of the plurality of communication devices may be determined based on location information received from the one or more of the plurality of communication devices. Each of the plurality of communication devices that are communicatively coupled to the IP multimedia gateway may be local with respect to the IP multimedia gateway or may be remote with respect to the IP multimedia gateway. A map of the determined corresponding locations, of one or more of the plurality of communication devices, may be generated for display by one or more of the plurality of communication devices. The IP multimedia gateway may be integrated in a set-top-box, a digital television or a video device such as projector. A first communication device of the one or more of the plurality of communication devices may comprise a video communication device that may be integrated in the set-top-box, the digital television or the video device. The first communication device may be operable to display the determined corresponding location information for one or more other of the one or more of the plurality of communication devices. Content may be communicated to one or more of the plurality of communication devices wherein the content may be determined based on the determined corresponding location of the one or more of the plurality of communication devices. Content and/or control information that may be received from the service provider devices may be utilized for communicating the content for the services. In a storage device, one or more locations may be associated with one or more of the plurality of communication devices. A cloned communication device may be detected when a determined corresponding location is different than the associated one or more locations. Furthermore, services to one or more of the plurality of communication devices may be restricted based on the associated locations. In this manner, communication devices may be tracked by an IP multimedia gateway and/or may receive services from the IP multimedia gateway based on the location of the communication device.

FIG. 1 is a diagram illustrating an exemplary communication system comprising an IP multimedia residential gateway that is operable to perform location aware tracking and services, in accordance with an embodiment of the invention. Referring to FIG. 1, there is shown a communication system 100 comprising a plurality of IP multimedia residential gateways (IMRGs), of which IMRGs 112-114 are illustrated, broadband IP networks 120 comprising a plurality of core networks of which core networks 122-129 are shown, a GNSS satellite network 160 comprising a plurality of GNSS satellites of which GNSS satellites 162, 164 and 166 are shown, a satellite reference system 168, a plurality of client devices 132a~132e, 134a~134c, 136a~136e, and 138a~138c, which are collectively referred to herein as client devices 132, 134, 136 and 138, respectively, a plurality of access networks 142-146, and IP-based application servers 150, of which application servers 150a-150c are displayed.

In various embodiments of the invention, the IMRGs 112 and/or 114 may operate under control of a service provider; however, the invention is not limited in this regard. For example, service provider equipment may comprise one or more devices in the core networks 122-129 and/or one or more of the IP-based application servers 150. The IMRGs 112 and/or 114 may be operable to receive content and/or control information from a service provider for tracking and/or providing services for the client devices 132, 134, 136 and/or 138. The IMRGs 112 and/or 114 may be operable to provide information regarding the client devices 132 and/or 134, respectively, to the service provider. In addition, one or more of the plurality of client devices 132, 134, 136 and/or 138 may be configured as a subscriber to the service provider. A service provider may be referred to as a service manager, a carrier or a network operator, for example.

The client devices 132, 134, 134, 136 and/or 138 may comprise communication devices that may be communicatively coupled to one or both of the IP multimedia gateways 112 and 114. The client devices 132a~132e may be referred to as local devices with regard to the IMRG 112 and the client devices 134a~134c, 136a~136e, and 138a~138c may be referred to as remote devices with regard to the IMRG 112. Similarly, the client devices 136a~136e may be referred to as local devices with regard to the IMRG 114 and the client devices 132a~132e, 134a~134c, and 138a~138c may be referred to as remote devices with regard to the IMRG 114.

An IMRG such as the IMRG 112 may comprise suitable logic, circuitry, interfaces and/or code that are operable to connect the client devices 132a-132e to the broadband IP networks 120 for services of interest. A service may be described or represented by the service type and the service class. The type of a service refers to the type of information to be transferred, such as data, voice, text or video for the service. A service with a given service type may be classified into a plurality of exemplary scheduling service classes, namely, data services for Internet access and messaging, conversational services for carrier-grade voice and/or video calls and conferences, location based services for services based on client locations, video services for TV, video and music streaming, gaming services for users to interact with one another via a central server, and corporate VPN services for access to enterprise intranet/email. Specific requirements may be placed on access networks and core networks for each service type and/or class to ensure desired end-to-end QoS. The service requirements on access networks and core networks may comprise, for example, system timing, CODEC, transmission rates, power-saving mechanisms, security profiles and content types. The system timing may be utilized to synchronize communications for delivery of service. The CODEC may comprise G.711, G.729, G.723, MPEG-4, VC-1, and VP6, for example. The power-saving mechanisms may comprise various power levels, which may be utilized within certain time intervals, for service transmissions. The security profiles may comprise service security descriptions such as, for example, security configurations and policies. The security configuration of a service may comprise protocols, credentials, and actions such as authentication actions. The content type of a service may specify what type of content that the service may comprise. The content type for a service may comprise, for example, Multipart Internet Mail Extensions (MIME) files, HTML pages, H.262, H.263, H.264/AVC video, G.711 voice, BV16, BV32 and DOCSIS Set-top Gateway (DSG) multimedia.

In various exemplary embodiments of the invention, the IMRG 112 may be operable to integrate local client devices as well as remote client devices to the broadband IP networks 120. Client devices such as the client devices 132a-132e that may access the IMRG 112 via device-dependent interfaces are referred to as local client devices for the IMRG 112. A device-dependent interface may generally represent the PHY and MAC functionality of a particular access technology such as, for example, Ethernet, Wi-Fi, Bluetooth, cordless, and/or Femtocell. Client devices such as the client devices 134a-134c that may remotely access the IMRG 112 via device-independent interfaces such as the broadband IP networks 120 are referred to as remote client devices for the IMRG 112. Client devices such as the client devices 136a-136e that may remotely access the IMRG 112 via other IMRGs such as the IMRG 114 are also referred to as remote client devices for the IMRG 112.

In various exemplary embodiments of the invention, the IMRG 112 may be operable to perform automatic device and network discovery. In this regard, the IMRG 112 may be operable to utilize proprietary methods and/or well-known networking protocols such as UPnP and DHCP, or a combination of both to perform search, in the background or transparently, for communicatively coupled client devices and broadband IP networks. For example, the IMRG 112 may be operable to multicast a discovery message. The IMRG 112 may discover or identify communicatively coupled devices and/or networks from responses received to the discovery message. In this regard, the IMRG 112 may be operable to retrieve or determine, from the received responses, client device capabilities for the discovered devices, and/or network capabilities for the discovered networks.

The network capabilities may comprise interface types, processing protocols, service types, service classes and service requirements on network side. The interface types for the identified networks may comprise technology specific broadband IP connections such as DSL, Cable, FTTx, PLC and WiMAX. The protocols may comprise service layer protocols such as SSL and STP, technology-independent IP layer protocols such as SIP, TCP, and technology-dependent IP layer protocols such as Base Station System GPRS Protocol (BSSGP).

The client device capabilities may comprise interface types, geo-location capabilities, processing protocols, service types, service classes and/or service requirements. The interface types for the identified device may comprise access interface types such as CDMA for GNSS, Multimedia over Coax Alliance (MoCa), WiFi, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless.

In various exemplary embodiments of the invention, the IMRG 112 may be operable to register discovered or identified client devices and networks into a local storage device. The local storage device may comprise the database 112*a* which may be utilized for storing and/or formatting information. In this regard, the registered client devices may comprise local client devices such as the client devices 132*a*-132*e* as well as remote client devices such as the client devices 134*a*-134*c*. Information such as client device capabilities and network capabilities may be stored in the local database 112*a* to support various applications or features. For example, the stored client device capabilities may be utilized to implement a local multimedia communication feature. The local multimedia communication feature may enable exchange of voice, video, and/or other forms of information among client devices of interest to support, for example, local multi-way conferences over local IP connections. In addition, the IMRG 112 may be operable to receive location information regarding the client devices 132*a*-132*e* and may be operable to store the location information in the database 112*a*.

In various exemplary embodiments of the invention, the IMRG 112 may be operable to access local client devices utilizing device-dependent interfaces. In this regard, the IMRG 112 may be operable to support link layer protocols for specific PHY and MAC functionality of a particular access technology. For example, in instanced where the IMRG 112 is signaled to access a Bluetooth enabled client device such as the client device 132*b*, the IMRG 112 may be operable to communicate information with the client device 132*b* utilizing Bluetooth air interface protocols.

The IMRG 112 may be operable to provide one or more common IP protocol-based interfaces towards client devices. In this regard, the IMRG 112 may be comprise a common IP layer client device interface to enable communication utilizing a wide range of client devices to, for example, a single common IP transport protocol and a single common IP signaling protocol. For example, the IMRG 112 may be operable to convert or configure different IP transport protocols utilized by the client devices 132*a*-132*e* into the single IP common transport protocol such as RTP. Different IP signaling protocols running on the client devices 132*a*-132*e* may be converted into the single common IP signaling protocol such as SIP.

The IMRG 112 may be operable to route and distribute information such as client location information, media, signaling and event packets among client devices registered to the IMRG 112. In this regard, the IMRG 112 may be operable to track registration status for client devices dynamically registered as local clients or remote clients (during roaming). The IMRG 112 may be configured to monitor and/or discover client device capabilities and network capabilities to dynamically configure registered client device based on client device capabilities and network capabilities.

The IMRG 112 may be configured to generate, receive and/or store client location information for one or more of the local client devices 132 and/or one or more remote client devices 134, 136 and 138. The IMRG 112 may be operable to route and/or distribute the client location information from one or more local or remote clients to one or more other local and/or remote clients. Furthermore, the IMRG 112 may be operable to route and/or distribute client 132 location information to one or more of the core networks 122-129 and/or to one or more of the IP-based application servers 150, for example, for use by a service provider. In this manner, a service provider may provide services to the local client devices 132 and/or to the remote client devices 134, 136 and/or 138 that utilizes client location information. The IMRG 112 may comprise suitable logic, circuitry interfaces and/or code that may be operable to process location information from one or more client devices. For example, the IMRG 112 may be operable to generate a geographical map that may indicate the location of one or more client devices at a specified time or may indicate a plurality of locations over an interval of time.

The IMRG 112 may be operable to control or manage system timing and power-saving mechanisms for registered client devices. For example, the IMRG 112 may be operable to adjust system timing based on corresponding service requirements for service deployment provided by different broadband IP networks over corresponding client devices. For example, the IMRG 112 may be operable to manage power consumption on client devices based on corresponding client device capabilities and network capabilities to receive content of services offered by one or more a service providers through different broadband IP networks.

The IMRG 112 may be operable to support various broadband connections such as, for example, DSL, Cable, FTTx, PLC and WiMAX. In this regard, the IMRG 112 may be operable to communicate with different broadband IP networks utilizing technology-dependent access for network access.

The IMRG 112 may be operable to dynamically configure one or more network interfaces within the IMRG 112 towards the broadband IP networks 120 for communicating with corresponding broadband IP networks. In this regard, the IMRG 112 may be configured to enable communication with different types of core networks by protocol mapping. For example, the IMRG 112 may be operable to convert a common IP media transport protocol such as RTP and a common IP signaling protocol such as SIP to different media transport and signaling protocols utilized by corresponding broadband IP networks.

The IMRG 112 may be operable to control or manage system timing and power-saving mechanisms for registered networks. For example, the IMRG 112 may be operable to adjust system timing based on corresponding service requirements for services provided by different broadband IP networks. For example, the IMRG 112 may be operable to control its own power levels and/or power consumption based on corresponding network capabilities to receive services from different broadband IP networks.

A client device such as the client device 132a may comprise suitable logic, circuitry, interfaces and/or code that are operable to receive services from different broadband IP networks through the IMRG 112. In various exemplary embodiments of the invention, the client device 132a may be operable to utilize an access technology specific interface such as Bluetooth, LTE, WiFi and/or Ethernet to communicate with the IMRG 112 for services offered by different broadband IP networks. The client device 132a may also be operable to communicate or exchange information with other client devices registered to the IMRG 112. In this regard, the client device 132a may share information, for example, its location information with local client devices such as client devices 132b-132e as well as remote client devices such as the client devices 134a-134c. The client device 132a may be dynamically configured to receive services such as location based services from the broadband IP networks 120 as well as networked client devices such as the client device 132e.

An access network such as the access network 142 may comprise suitable logic, circuitry, communication devices, interfaces and/or code that are operable to communicate services utilizing various access technologies such as, for example, IP LAN, Bluetooth, WiFi, Femtocell, LTE and WiMAX.

An IP-based application server 150 such as the IP-based application server 150a may comprise suitable logic, circuitry, interfaces and/or code that are operable to provide IP-based services to various broadband IP networks 120. In this regard, the IP-based application server 150a may be configured to deliver carrier-grade as well as non-carrier-grade broadband access services to users through the broadband IP networks 120. The IP-based application server 150a may be operable to schedule delivery of carrier-grade services to ensure service integrity. No-carrier-grade services may be delivered when needed without reliability and stability ensured.

In various embodiments of the invention, one or more of the IP-based application servers 150 may support location determination for client devices such as the client devices 132, 134, 136 and 138. For example, one or more of the IP-based application servers 150 may comprise a location server that may be operable to retrieve satellite reference data regarding the GNSS satellite network 160 from the satellite reference system 168 and may provide GNSS location determination assistance to the client devices 132, 134, 136 and 138 as needed. For example, location assistance information may be communicated from one or more of the IP-based application servers 150 to the client device 132d via the one or more of the broadband IP networks 120, the IMRG 112 and the access network 142. The IMRG 112 may store and/or forward the location assistance data to the client device 132d, for example. The client device 132d may utilize the location assistance information to access signals from the GNSS satellite network 160 and/or to determine its location.

In various embodiments of the invention, one or more of the IP-based application servers 150 may comprise suitable logic, circuitry, interfaces and/or code that may be operable to store location information regarding the client devices 132, 134, 136 and/or 138, for example, for use by a service provider. For example, the IMRG 112 may communicate location information regarding client devices to one or more of the IP-based application servers 150. In this regard, the IP-based application servers 150 may comprise a database for storing the location information. The location information may be utilized to provide content and/or control information to the IMRG 112, for services to the clients 132, 134, 136 and/or 138. For example, based on a location of a client device, a service provider device may determine content and/or services that may be provided by the IMRG 112 to the client device. Furthermore, client location information may be utilized by a service provider device and/or the IMRG 112 for security applications.

The client devices 132, 134, 136 and 138 may comprise suitable logic, circuitry, interfaces and/or code that may be operable to utilize data associated with the GNSS satellite network 160 to determine their location. The client devices 132, 134, 136 and 138 may be operable to determine their location autonomously or with assistance from various network elements, for example, from a location server in one or more of the IP-based application servers 150. In various embodiments of the invention, other network elements, for example, the IMRG 112 and/or one or more of the broadband IP networks 120, may be operable to support location determination by providing location and/or time information to one or more of the client devices 132, 134, 136 and 138.

One or more of the client devices 132, 134, 136 and 138, may comprise suitable logic, circuitry, interfaces and/or code that are operable to receive satellite broadcast signals from one or more satellites of the GNSS satellite network 160 that may be in view, for example, the GNSS satellites 162, 164 and/or 166. For example, the client device 132d may take various GNSS measurements such as pseudorange and/or carrier phase on the received GNSS signals to calculate navigation information such as, for example, GNSS position of the client device 132d. The client device 132d may communicate its location to the IMRG 112, for example, which may store the location. The IMRG 112 may communicate the client device 132d location information to other local client devices 132 or to remote client devices 134, 136 and/or 138. The IMRG 112 may also communicate the client device 132d location information to network devices such as the Broadband IP networks 120 and/or the IP based application servers 150. In this manner, a service provider may receive and utilize the client device 132d location information for one or more services and/or applications, for example.

Although IP multimedia residential gateways (IMRGs) are illustrated in FIG. 1 for connecting client devices through a common-protocol-based interface to broadband IP networks via a configurable interface, the invention may not be so limited. Accordingly, other IP multimedia gateways for connecting client devices through a common-protocol-based interface to broadband IP networks via a configurable interface may be supported without departing from the spirit and scope of various embodiments of the invention. The IP multimedia gateways may be located in a residential location and/or non-residential locations comprising, for example, a commercial building, an office, an office complex, an apartment building and/or a factory.

In an exemplary embodiment of the invention, the IMRG 112 may be operable to communicate with a service provider device to determine location based services that may be available to client devices. The IMRG 112 may be operable to exchange information with the a service provider to determine a location based service profile corresponding to one or more communicatively coupled client devices. A location based service profile may be associated with a single client device based on its corresponding location and/or it may be associated with a plurality of client devices whose corresponding locations may comprise a specified area. For example, corresponding locations for the client devices 132a–132e may be located within a specified area that may be associated with a single location based service profile. A location based service profile may comprise information such as, for example, types of services and/or content that may be available to client devices at a specified location and/or may comprise access permissions for one or more client devices based on their location. In addition, a location based service profile may comprise information associated with a client device that may receive the location based services. For example, a location based service profile for a specified client device may comprise user preferences, user permissions and/or a user service agreement profile that may be based on a service provider service agreement, for example. In this regard, different classes of service may be subscribed to by a client device that may enable communication such as video and music streaming, voice services, interactive gaming services and/or 3D video at appropriate data rates and/or quality of service.

The IMRG 112 may be operable to receive the location based service profiles from a service provider. The received location based service profiles may be generated by a service provider device for local and/or remote client devices that are communicatively coupled to the IMRG 112. The IMRG 112 may acknowledge receipt and/or accept the location based service profiles from the service provider.

In an exemplary embodiment of the invention, the IMRG 112 may be operable to provide location based services to one or more local and/or remote communicatively coupled client devices based on a location based profile received from a service provider. In various embodiments of the invention, a service provider device may control and/or manage the location based services and/or may communicate location based services via the IMRG 112 to the local and/or remote communicatively coupled client devices. In other embodiments, the IMRG 112 may be operable to manage and/or control location based services to the communicatively coupled local and/or remote client devices based on location based service profiles. For example, the IMRG 112 may receive location information from the client device 132e and may communicate the location information to the remote client device 136a in instances when a location profile for the client device 136a comprises permission to receive location information regarding the client device 132e.

In an exemplary operation, an IMRG such as the IMRG 112 may be operable to communicatively couple a plurality of client devices to the broadband IP networks 120. Client devices discovered by the IMRG 112 may be registered together with corresponding client device capabilities and/or location based profiles into the local database 112a to support applications such as location based services. The IMRG 112 may serve local client devices such as the client devices 132a-132e as well as remote client devices such as the client devices 134a-134c. Local client devices may communicate with an associated IMRG over device-dependent interfaces such as IP LAN, Bluetooth, WiFi, Femtocell, LTE and WiMAX. Remote client devices may exchange or communicate information with an associated IMRG over device-independent interfaces such as, for example, the broadband IP networks 120. A client device such as the client device 132a may initially register as a local client device and become a remote client device to the IMRG 112 when the client device 132a roams outside of a local coverage area served by the IMRG 112. Similarly, a client device such as the client device 134a may initially register on the IMRG 112 as a remote client device. In instances where the client device 134a moves into the local coverage area of the IMRG 112, the remote client device may be registered as a local client device.

In various embodiments of the invention, the IMRG 112 may be operable to store location information of the local client devices 132 and/or of the remote devices 134, 136 and/or 138 in the database 112a, for example. The location information may be determined in various ways. For example, one or more of the client devices 132, 134, 136 and/or 138 may be operable to determine their location utilizing GNSS satellite information and may communicate it to the IMRG 112. Alternatively, users may enter location information for one or more of the client devices 132, 134, 136 and 138 and/or may communicate the location information to the IMRG 112. For local client devices, for example, the client devices 132, the IMRG 112 may be operable to utilize its own location to determine client device location. The IMRG 112 and/or a service provider may provide services to the client devices 132, 134, 136 and 138 based on their locations.

The IMRG 112 may be operable to share location information for one or more client devices with other client devices depending on location based profiles of the client devices. For example, the client device 132d may report its location to the IMRG 112. The IMRG 112 may communicate the client device 132d location information to one or more other local or remote client devices 132 134, 136 and/or 138 in instances when the other client devices have permission to receive the location information. The location of the client device 132d may be displayed on one or more of the client devices 132, 134, 136 and 138 that receives the location of the client device 132d. In an exemplary embodiment of the invention, the IMRG 112 may be integrated within a video set-top-box, a digital television or a video projector, for example, which may also comprise a video display client device or may be coupled to a video display client device. As the client device 132d travels to various locations and reports its location information from the various locations to the IMRG 112, the IMRG 112 may communicate the various locations the video display client device that is coupled to the STB for display of the locations travelled to by the client device 132d. In this manner, local and/or remote client devices 132, 134, 136 and/or 138 may also receive the location information from the IMRG 112 and users may view the locations travelled by the client device 132d on the client devices 132, 134, 136 and/or 138.

In various embodiments of the invention, the IMRG 112 and/or the IMRG 142 may be operable to communicate location information about the client devices 132, 134, 136 and/or 138 to a service provider. A service provider device may store the location information in a storage device that may reside in, for example, in one or more of the core networks 122-129 and/or one or more of the IP-based application servers 150, for example. The service provider may utilize corresponding location information for the client device 132, 134, 136 and/or 138 for any suitable purpose, for example, for providing location based services and/or location based security applications. In addition, the service provider may provide content and/or control information to the IMRGs 112 and/or 114 to support client device location tracking and/or to support location based services provided by the IMRGs to client devices.

In an exemplary embodiment of the invention, the IMRGs 112 and/or 142 may be configured, for example, by a service provider, to provide location specific content to one or more local and/or remote client devices 132, 134, 136 and/or 138. For example, the client device 132d may be located near the IMRG 112. The IMRG 112 may provide content to the client device 132d based on its current location, for example, content regarding local businesses and/or local services. In instances, when the client device 132d travels to a new location near another IMRG, for example, the IMRG 114, the IMRG 112 and/or the IMRG 114 may provide content appropriate for the new location to the client device 132d. In instances when the client device travels to a location that may not be near another IMRG, the IMRG 112 may communicate with the client device 132d via the broadband IP networks 120, for example.

In another exemplary embodiment of the invention, a service provider may utilize one or more IMRGs to determine if a client device has been cloned. For example, a client device 132d may be cloned such that a plurality of client devices may be operable to access networks and services utilizing secure identity information of the client device 132d. A plurality of cloned client devices may access networks and appear to be the client device 132d. The IMRG 112 may be installed in a residence of a user of the authentic client device 132d. The user may be a subscriber to a service provider and the residence of the subscriber may be may be known to the service provider and/or may be entered in the user's client device location based profile. The service provider may provide the IMRG 112 with a location based profile for the client device that may comprise the user's residence and/or locations from which the client device 132d may be allowed access the IMRG 112 and/or other network devices. For example, the IMRG 112 may associate the user's residence and/or the allowed locations with the client device 132d in a database. The authentic client device 132d may determine its location to be at the user's residence and may provide its location to the IMRG 112. The IMRG 112 may allow access to the local client device 132d. Concurrently one or more of the cloned devices may attempt to remotely access the IMRG 112 and/or other network devices from locations that are not permitted in the location based profile. The IMRG 112 may determine which devices are cloned and may reject network access and/or otherwise disable the cloned client devices while allowing the authentic client device 132d access to networks and services based on its location.

In another exemplary embodiment of the invention, one or more IMRGs, for example, the IMRGs 112 and 114 may comprise suitable logic, circuitry, interfaces and/or code that may be operable to limit or deny usage of a client device in specified geographic locations. For example, various IMRG services may be restricted to use in specified locations. In instances when a client device roams away from a specified location, an IMRG may deny service to the client device.

Figure 2:
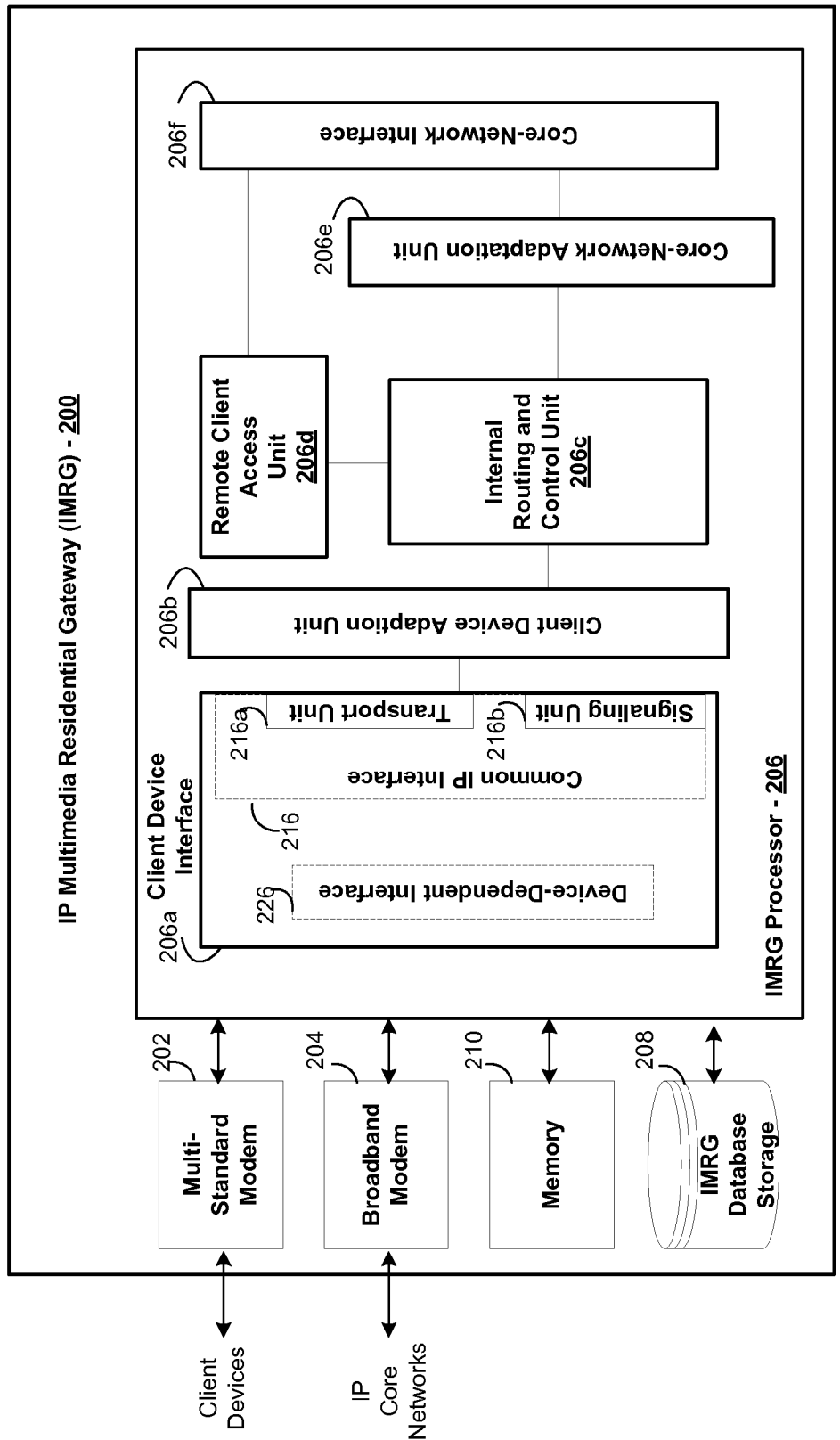
FIG. 2 is a diagram illustrating an exemplary IP multimedia residential gateway (IMRG) that performs location based tracking and/or location based services for local and/or remote client devices, in accordance with an embodiment of the invention.

FIG. 2 is a diagram illustrating an exemplary IP multimedia residential gateway (IMRG) that performs location based tracking and/or location based services for local and/or remote client devices, in accordance with an embodiment of the invention. Referring to FIG. 2, there is shown an IP multimedia residential gateway (IMRG) 200 comprising a multi-standard modem 202, a broadband modem 204, an IMRG processor 206, an IMRG database storage 208 and a memory 210.

The IMRG 200 may be similar and/or substantially the same as the IMRG 112 and/or the IMRG 142. Furthermore, the IMRG 200 may stand alone or may be integrated within another device, for example, a set-top-box, a digital television and/or a video projector.

The multi-standard modem 202 may comprise suitable logic, circuitry, interfaces and/or code that are operable to communicate with a plurality of client devices such as the client devices 132a-132e and 134a-134c utilizing a device-dependent interface such as, for example, Ethernet, Wi-Fi, Bluetooth, cordless, and/or Femtocell. For example, location information may be communicated from one or more local client devices 132 and may be received by the IMRG 200 via the multi-standard modem 202. Moreover, location information regarding local or remote client devices may be reported by the IMRG 200 to one or more local client devices via the multi-standard modem 200.

The broadband modem 204 may comprise suitable logic, circuitry, interfaces and/or code that are operable to transmit voice and/or data in adherence with one or more internet protocol (IP) broadband standards. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 for communication with the broadband IP networks 120. For example, in instances when the broadband modem 204 is signaled to exchange information with the GPRS core network 124, the broadband modem 204 may be configured to utilize DSL as an access solution to the GPRS core network 124. The IMRG 200 may be operable to communicate location information to a service provider device of the GPRS core network 124 via the broadband modem 204. Furthermore, the IMRG 200 may be operable to communicate location information regarding one or more client devices to one or more other remote client devices via the broadband modem 204.

The IMRG processor 206 may comprise suitable logic, circuitry, interfaces and/or code that are operable to perform a variety of signal processing tasks to maintain or manage communication between associated client devices such as the client devices 132a-132e and 134a-134c and the broadband IP networks 120, and/or among the associated client devices. The IMRG processor 206 may comprise a client device interface 206a, a client device adaptation unit 206b, an internal routing and control unit 206c, a remote access unit 206d, a core-network adaptation unit 206e and a core-network interface 206f. The IMRG processor 206 may comprise suitable logic, circuitry interfaces and/or code that may be operable to process location information from one or more client devices. For example, the IMRG processor 206 may be operable to generate a geographical map that may indicate the location of one or more client devices at a specified time and/or over a specified time interval of time.

The client device interface 206a may comprise suitable logic, circuitry, interfaces and/or code that are operable to perform protocol conversion for client device access. The client device interface 206a may comprise a device-dependent interface 226 and a common IP interface 216. The device-dependent interface 226 may comprise suitable logic, circuitry, interfaces and/or code that are operable to access local client devices over device-dependent connections such as WiFi and LTE connections. The device-dependent interface 226 may be operable to support link layer protocols for specific PHY and MAC functionality of a particular access technology. For example, in instances where the client device interface 206a is signaled to access a WiFi enabled client device such as the client device 132c, the client device interface 206a may exchange information with the client device 132c utilizing WiFi air interface protocols for corresponding link layer communication. The device-dependent interface 226 may support different IP transport and/or signaling components utilized by client devices.

The common IP interface 216 may comprise suitable logic, circuitry, interfaces and/or code that are operable to provide a common IP support to communicate content between various client devices and the broadband IP networks 120. The common IP interface 216 may comprise a transport unit 216a and a signaling unit 216b. The transport unit 216a may comprise suitable logic, circuitry, interfaces and/or code that are operable to provide a single IP transport component such as RTP to support data communication over IP. The signaling unit 216b may comprise suitable logic, circuitry, interfaces and/or code that are operable to provide a single IP signaling component such as SIP to support signaling communication over IP. The client device interface 206a may perform protocol mapping or translation between different IP transport and/or signaling components utilized by client devices and the common IP-based interface 216 running on the IMRG processor 206.

The client device adaptation unit 206b may comprise suitable logic, circuitry, interfaces and/or code that are operable to adapt a wide range of client devices. In this regard, the client device adaptation unit 206b may be operable to perform, for example, media or content transcoding, rate conversion, system timing adjustment and/or power control based on corresponding client device capabilities to improve user experiences.

The internal routing and control unit 206c may comprise suitable logic, circuitry, interfaces and/or code that are operable to route and distribute geographic location information, media, signaling and event packets among client devices registered to the IMRG 112, for example. In this regard, the internal routing and control unit 206c may be operable to keep track of registration status for associated client devices. In instances where a client device such as the client device 132a is within a local client area served by the IMRG 112, the internal routing and control unit 206c may be operable to register the client device 132a in the IMRG database storage 208 as a local client device of the IMRG 112. In instances where a local client device such as the client device 134a roams outside of the local coverage area, the internal routing and control unit 206c may register the client device 134a in the IMRG database storage 208 as a remote client device for the IMRG 112.

The internal routing and control unit 206c may collect and/or track client device capabilities for associated client devices and network capabilities to build the IMRG database storage 208. The internal routing and control unit 206c may be operable to dynamically configure associated client devices based on collected system capability information. In addition, the internal routing and control unit 206c may be operable to collect and/or track geographic location information for local and/or remote client device and may store the location information in the IMRG database storage 208. Other information such as user profiles and/or preferences, content and/or control information may also be stored in the IMRG database storage 208 and/or may be associated with the client devices and/or with various locations. The internal routing and control unit 206c may be operable to communicate information to the client devices based on their location. The information may be communicated to one or more individual devices and/or may be broadcast to a plurality of client devices. In addition, the internal routing and control unit 206c may be operable to coordinate or control system timing adjustment and power control management for delivery of service.

The remote client access unit 206d may comprise suitable logic, circuitry, interfaces and/or code that are operable to provide necessary functionality for the support of remote access by client devices that are roaming outside of a local coverage of the IMRG 112. In this regard, the remote access unit 206d may be operable to exchange information with remote client devices over broadband connections to the broadband IP networks 120. For example, the remote client access unit 206d may be operable to send and/or receive geographic location information to and/or from remote client devices.

The core-network adaptation unit 206e may comprise suitable logic, circuitry, interfaces and/or code that are operable to provide adaptation to different broadband IP networks for various client devices. In this regard, the core-network adaptation unit 206e may perform, for example, protocol translation and mapping between a common IP protocol utilized by the IMRG 200 and protocols used by different broadband IP networks.

The core-network interface 206f may comprise suitable logic, circuitry, interfaces and/or code that are operable to provide various broadband connections such as, for example, DSL, Cable, FTTx, PLC and WiMAX for access to the broadband IP networks 120.

The IMRG database storage 208 may comprise suitable logic, circuitry, interfaces and/or code that are operable to store and manage client device information and network information. In this regard, the IMRG database storage 208 may comprise registration status information for associated client devices. The registration status for a client device pertaining to the IMRG 200 may be a local client device or a remote client device. The IMRG database storage 208 may be operable to keep track of or collect client device and network capabilities. The collected capability information may be utilized to dynamically configure client devices pertaining to the IMRG 200. In addition, the IMRG database storage 208 may be operable to store location based service profiles for client devices and/or for specified locations. The IMRG database storage 208 may be operable to store local and/or remote client device location information and/or data that may be associated with a particular location and/or with a particular client device. For example, for detecting cloned client devices, the IMRG database storage 208 may store locations where client devices may be known to be utilized by a subscriber. Usage in other locations may indicate the presence of a cloned device. In another exemplary embodiment of the invention, information regarding local businesses and/or local advertizing may be stored in the IMRG database storage 208 and may be communicated to one or more client devices when they are utilized in a specified area. In some embodiments of the invention, the database information may be received from a service provider. The information may be updated based on changing locations of a client device. The IMRG database storage 208 may comprise RAM, ROM, low latency nonvolatile memory such as flash memory and/or other suitable electronic data storage capable of storing data and instructions The memory 210 may comprise suitable logic, circuitry, interfaces and/or code that are operable to store and manage data and/or other information utilized by the IMRG processor 206. For example, the memory 210 may be utilized to store processed data or content generated by the IMRG processor 206. The memory 210 may be enabled to store executable instructions to process, for example, protocol mapping and/or media transcoding. The memory 210 may comprise RAM, ROM, low latency nonvolatile memory such as flash memory and/or other suitable electronic data storage capable of storing data and instructions.

In an exemplary operation, the IMRG 200 may be operable to communicate with local and/or remote client devices as well as with IP broadband networks 120 and/or one or more service provider devices, for example. The IMRG processor 206 may be operable to communicate with local client devices utilizing the device-dependent interface 226 within the client device interface 206a. The IMRG processor 206 may be operable to access, via the broadband modem 204, the broadband IP networks 120 utilizing various broadband access technologies such as DSL, Cable, FTTx, PLC and WiMAX supported by the core-network interface 206f.

The IMRG 200 may be operable to receive client device location information and may provide information and/or services to the client devices based on their location. For example, the IMRG 200 may receive location information from local client devices via the multi-standard modem 202. The IMRG 200 may receive location information from remote client devices via the broadband modem 204. The internal routing and control unit 206 may be operable to collect and/or track the location of the local and/or remote client devices, which may be stored in the IMRG database storage 208. The IMRG 200 may be operable to communicate, via the broadband modem 204, with a service provider device to determine location based profiles, appropriate content and/or services for one or more client devices based on the client device location. The IMRG 200 may communicate client device location information to the service provider device and/or to one or more remote client devices via the common IP interface and/or via the broadband modem 204. The internal routing and control unit 206c may also be operable to control communication of client device location information to local client devices via the client device interface 206a and the multi-standard modem 202.

In an exemplary embodiment of the invention, the IMRG 200 may be similar and/or substantially the same as the IMRG 112 shown in FIG. 1. The client device 132d may be a handheld communication device that is located within communication range of the IMRG 200. For example, the client device 132d may communicate with the IMRG 200 via the access network 142 utilizing WiFi protocol. The IMRG 200 may discover and/or register the client device 132d within the IMRG database storage 208. The IMRG 200 may receive a current location of the local client device 132d from the client device 132d via the access network 142 and via the multi-standard modem 202 and the client device interface 206a in the IMRG 200. The IMRG processor 206 may be operable to store the location of the client device 132d in the IMRG database storage 208. The location of the client device 132d may be communicated to the service provider.

A location based profile may be generated by the service provider and may be communicated to the IMRG 112. The IMRG database storage 208 may store content that is associated with the client device 132d and/or with the current location of the client device 132d. In various embodiments of the invention, the IMRG processor 206 may be operable to request updated content from the service provider, based on the current location of the client device 132d. For example, the content may be provided from the IP based application server 150b. The IMRG processor 206 may be operable to communicate with the IP based application server 150b that may comprise a service provider device, utilizing the core network interface 206f, and the broadband modem 204. The IMRG 200 may be operable to receive new content for the client device 132d and may communicate the new content to the client device 132d via the multi-standard modem 202 and the client device interface 206a. For example, the content may comprise local information that may be appropriate for a subscriber that utilizes the client device 132d, for example.

In other embodiments of the invention, the IMRG 200 may be operable to broadcast or multicast location sensitive content to a plurality of local client devices such as the client devices 132a-132e. In instances when a client device may roam away from the local coverage area of the IMRG 200, to a remote location such as the location of the client device 134c or 136d, the remote access unit 206d may handle access to the IMRG 200 and/or handle exchange of information between the IMRG 200 and the client devices. For example, the remote access unit 206d may be operable to receive location information from the remote client device 134c via the broadband modem 204 and the broadband IP networks 120. Furthermore, the IMRG 200 may be operable to communicate content to the client device 134c that may be determined based on the location of the client device 134c and/or based on subscriber preferences, for example.

Figure 3:
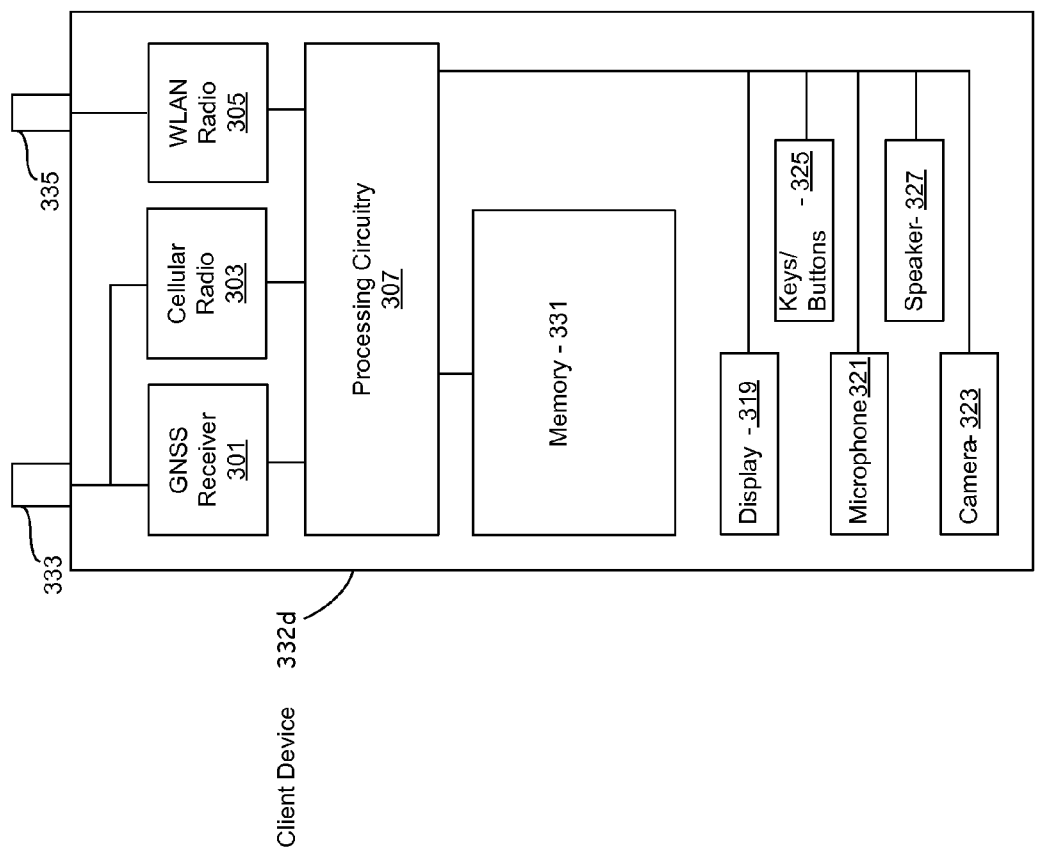
FIG. 3 is a diagram illustrating an exemplary client device that may be operable to provide its location to an IP multimedia residential gateway (IMRG) and/or may receive services from the IMRG, in accordance with an embodiment of the invention.

FIG. 3 is a diagram illustrating an exemplary client device that may be operable to provide its location to an IP multimedia residential gateway (IMRG) and/or may receive services from the IMRG, in accordance with an embodiment of the invention. Referring to FIG. 3, there is shown the client device 132d that comprises a GNSS receiver 301, a cellular radio 303, a wireless local area network (WLAN) radio 305, processing module 307, memory 331, display 319, microphone 321, camera 323, keys and buttons 325, speaker 327, GNSS and Cellular antenna 333 and WLAN antenna 305.

The client device 332d may be similar or substantially the same as the client device 132d described with respect to FIG. 1. The client device 332d may comprise a GNSS receiver 301 which may comprise suitable logic, circuitry, interfaces and/or code that may enable reception of GNSS signals and determine a geographic location of the client device 332d. For example, the client device 332d may be operable to receive GNSS signals from the GNSS satellite network 160 via the GNSS receiver 301. The GNSS receiver 301 may determine the location of the client device 332d based on network assisted GNSS methods and/or based on autonomous methods. With regard to network assisted GNSS methods, the satellite reference system 168 may comprise a ground based satellite receiver system that may receive GNSS satellite data from the GNSS satellite network 160. The satellite reference system 168 may communicate the GNSS satellite data to a location server such as one or more servers in the IP based application servers 150. The location server may communicate the GNSS satellite data to the client devices 132, 134, 136 and/or 138. The GNSS satellite data may comprise precise time, orbital data and/or almanac data, for example, for the GNSS satellite system 160. The GNSS satellite data may enable the GNSS receiver 301 to lock onto signals from the GNSS satellites 162, 164 and/or 166 more rapidly. The GNSS assistance data may be received by the client device 332d from the satellite reference system 168 and/or a location server in the IP based application servers 150, for example, via the broadband IP networks 120 and/or via the access network 142. In an exemplary embodiment of the invention, the client device 332d may receive GNSS assistance data from one of the access networks 142 via WLAN signals and the WLAN radio 305 and/or via cellular signals and/or the cellular radio 303. Notwithstanding, the invention is not limited with regard to any specific type of location determination methods and any suitable methods and/or location technology may be utilized for determining a location of the client device 132d.

The cellular radio 303 may comprise suitable logic circuitry interfaces and/or code that may enable transmission and reception of RF cellular signals via the antenna 333. For example, the cellular radio 303 may enable communication with a cellular base station in one of the access networks 144, for example. In addition, the cellular radio 303 may be operable to exchange signals with the processing module 307 for baseband processing. The wireless technology utilized in the cellular radio 303 is not limited to any specific type and any suitable wireless technology may be utilized, for example, GSM, CDMA, WCDMA, OFDMA, LTE and WIMAX.

In various embodiments of the invention, a location for the client device 132d may be determined based on the location of a plurality of cellular base stations that may be communicatively coupled to the client device 132d. The location may then be communicated to the client device 132d, to an IMRG and/or to a service provider, for example, via the cellular radio 303. For example, the plurality of cellular base stations and/or the client device 132d may determine a distance between the client device 132d and each of the cellular base stations. In this regard, the cellular base stations and/or the client device 132d may measure the distance based on "time of arrival" signaling methods. In instances when location is known for each of the cellular base stations, and the distance between the client device 132d and each of the base stations is known, the client device 132d and/or a cellular base station, for example, may utilize triangulation methods to determine the location of the client device 132d. In instances when three cellular base stations are utilized, a latitude and longitude may be estimated for the client device. In instances when four or more cellular base stations are utilized, latitude, longitude and altitude may be estimated, for example. Furthermore, a coarse estimation of location for the client device 132d may be determined based on which cellular base station is serving the client device 132d and/or which antenna face is serving the client device, for example.

The WLAN radio 305 may comprise suitable logic, circuitry interfaces and/or code that may be operable to perform transmission and/or reception of RF signals for the communication of data traffic via the antenna 335. In addition, the WLAN radio 305 may be operable to exchange data with the processing module 307 for baseband processing. Communication via the WLAN radio 305 may be based on any suitable data communication standard such as various IEEE 802.11 and/or Wi-Fi Alliance standards for example. The client device 332d may be operable to communicate location information via the WLAN radio 305, for example, to the IMRG 112 which may be similar and/or substantially the same as the IMRG 200. Similar to the methods utilized for determining a geographic location corresponding to the client device 132d with respect to a cellular base station, WiFi based triangulation methods may be utilized to determine an estimated client device location. In this regard, the client device 132d may be operable to communicate with one or more WiFi based devices via the WLAN radio 305. The one or more WiFi based devices may know their own locations. Distances may be measured between each of the WiFi devices and the client device 132d. A location for the client device 132d may be estimated utilizing the triangulation. In addition, a coarse estimation of location for the client device 132d may be determined based on a known location of a WiFi device that is serving the client device 132d.

The processing module 307 may comprise suitable logic, circuitry, interfaces and/or code that may be operable to process baseband communication signals and may support services provided by the IMRG 112, for example, client device location tracking functionality. In some embodiments of the invention, the client device 332d may be protected by secure operations. In this regard, the processing module 307 may comprise a security processor that may be operable to manage and/or control secure communication between the client device 332d and IMRG 112. The processing module 307 may comprise suitable logic, circuitry and/or code that may be operable to process location information of one or more other client devices that may be received from an IMRG, for example, the IMRG 112. For example, the processing module 307 may be operable to generate a geographical map that may indicate the location of one or more client devices at a specified time or over an interval of time.

The memory 331 may comprise suitable logic, circuitry interfaces and/or code that may be operable to provide storage for instructions and data for tasks performed by the client device 332d. The memory 331 may comprise ROM and/or flash memory, for example.

The client device 332d may comprise a plurality of human interfaces that may be utilized for capturing communication information and for interfacing with various features within the client device 332d. For example the client device 332d may comprise a display 319 and speaker 327 that produce images and/or sound for cellular communication and/or for rendering multi-media, for example. The display may be utilized to visually display the tracked location of the other client devices. The microphone 321 and camera 323 may be utilized for voice calling and/or for capturing and storing multi-media data, for example. The keys and/or buttons comprise a keyboard and/or number entry for creating messages and/or interfacing with client device 332d features. In various embodiments of the invention, other types of human interfaces may be utilized. For example, touch screen, voice and/or pressure sensors may be utilized for inputting information and/or other user interaction.

In operation, the client device 332d may comprise suitable logic, circuitry, interfaces and/or code that may be operable to determine its location and may communicate its location to the IMRG 112. The client device 332d may be operable to communicate with the IMRG 112 locally via the WLAN radio 305, for example. The client device 332d may be operable to communicate with the IMRG 112 from a remote location via the WLAN radio 305 and/or the cellular radio 303 and the broadband IP networks 120, for example. The IMRG 332d may receive services and/or information from the IMRG 200 based on the location of the client device 332d. In addition, the client device 332d may be operable to receive location information regarding other client devices that may be associated with the IMRG 112. For example, the client device 332d may be operable to display locations of one or more other client devices on the display 319.

Figure 4:
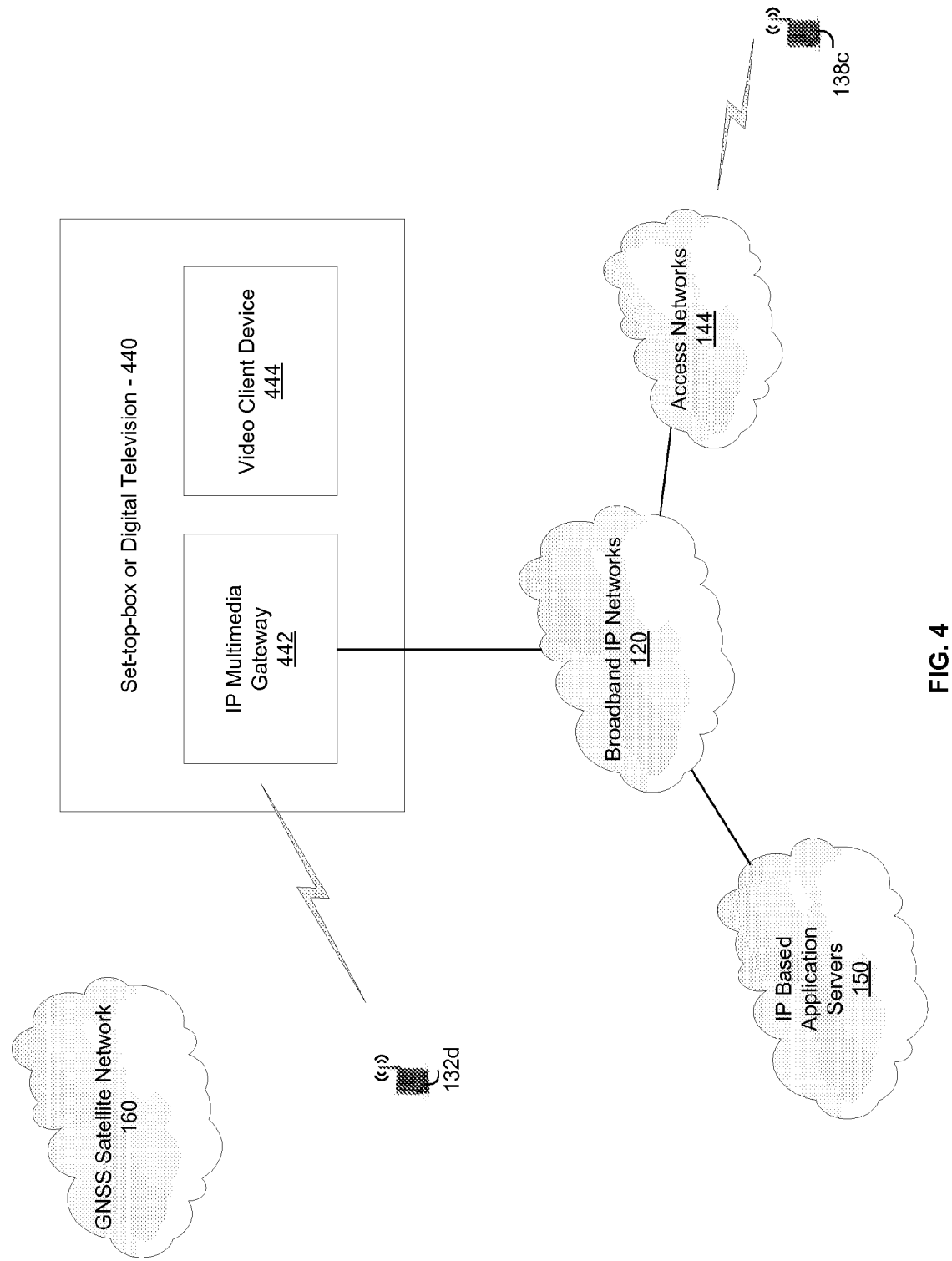
FIG. 4 is a diagram illustrating an exemplary IP multimedia residential gateway (IMRG) that is integrated within a set-top-box or digital television, in accordance with an embodiment of the invention.

FIG. 4 is a diagram illustrating an exemplary IP multimedia residential gateway (IMRG) that is integrated within a set-top-box or digital television, in accordance with an embodiment of the invention. Referring to FIG. 4, there is shown a set-top-box and/or digital television 440 which may be referred to as STB/DTV 440, an IP multimedia residential gateway (IMRG) 442, a video client device 444, the client device 132d and the client device 138c. Also, there is shown, the GNSS satellite network 160, the IP based application servers 150, the broadband IP networks 150 and the access networks 144.

The client devices 132d and 132c may be similar or substantially the same as the client device 332d.

The STB/DTV 440 may comprise a set-top-box, digital television and/or a video projector, for example. The STB/DTV 440 may comprise an IMRG 442 and a video client 444. The IMRG 442 and the video client 444 may be communicatively coupled.

The IMRG 442 may be similar to the IMRG 112 and/or the IMRG 200. The IMRG 442 may be communicatively coupled to the IP broadband networks 120, the IP based application servers 150 and/or one or more client devices such as the client devices 132, 134, 136 and 138. The client device 132d may be a local client device that may be located near the STB/DTV 440 and may communicate with the IMRG 442 based on any suitable access technology, for example, WLAN, WiFi and/or a tethered technology. The client device 138d may be a remote client device that may communicate with the IMRG 442 via the access networks 144 and/or the broadband IP networks 120, for example. The client devices 132d and/or 138c may be operable to determine their location, for example, utilizing signals received from the GNSS satellite network 160. Notwithstanding, the invention is not limited with regard to how the IMRG 442 receives and/or determines the location of one or more of the client devices. The client devices 132d and/or 138c may be operable to communicate their location to the IMRG 442. The IMRG 442 may be operable to communicate location information corresponding to the client devices to a service provider. The IMRG 442 may be operable to receive and/or store location based profiles from a service provider to be utilized for providing location based services to the coupled client devices.

The video client 444 may comprise suitable logic, circuitry, interfaces and/or code that may be operable to receive video and/or services from, for example, a cable or satellite service provider device and/or a video recorder and/or playback device. Exemplary services may comprise providing video and/or other products for purchase, security services and/or video recording services. In various embodiments of the invention, the video client 444 may be operable to process multimedia such as 2D and/or 3D video, audio and/or graphics data. The video client 444 may be operable to display the multimedia, for example, on a display panel or by a video projection device. The video client 444 may be communicatively coupled to the IMRG 442 and may be operable to receive location information and/or services from the IMRG 442, for example, regarding one or more local and/or remote client devices such as the client devices 132, 134, 136 and 138 shown in FIG. 1.

One or both of the video client device 444 and the IMRG 442 may comprise suitable logic, circuitry, interfaces and/or code that may be operable to process location information regarding one or more of the client devices 132, 134, 136 and/or 138. For example, the video client device 444 and/or the IMRG 442 may be operable to generate a geographical map that may indicate the location of one or more of the client devices 132, 134, 136 and/or 138 at a specified time and/or over an interval of time. The video client device 444 may be operable to display the location information, for example, the generated map that may indicate the location of one or more of the client devices on a video screen. For example, the video client device 444 may be operable to display one or more locations of the client devices 132d and/or 138c over time.

In operation, the client devices 132d and 138c may each determine their respective geographic locations and may communicate their location information to the IMRG 442. Moreover, the client devices 132d and/or 138c may repeatedly over time, determine and communicate their location information to the IMRG 442. The IMRG 442 may store the location information in a storage device comprising a database such as the IMRG database storage 208 described with respect to FIG. 2. In addition, the IMRG 442 may store location based profiles for the client devices 132d, 138c and/or the video client 444. The IMRG 442 may generate a map comprising the locations of one or both of the client devices 132d and 138c. The IMRG 442 may communicate the map and/or the location information to the video client 444. The video client 444 may be operable to display the location information and/or the map. Furthermore, the IMRG 442 may be operable to communicate the map and/or the location information to one or more of the client devices 132, 134, 136 and 138 which may store and/or display the map and/or location information according to permissions and/or preferences stored in location based profiles. In other embodiments of the invention, the client devices may be operable to generate a map of client device locations. For example, the IMRG 442 may communicate the location information of the client devices 132d and 138c to one or more of the video client device 444 and/or the client devices 132, 134, 136 and/or 138. The video client device 444 and/or the client devices 132, 134, 136 and/or 138 may be operable to generate and/or display a map of the client device 132d and 138c locations.

Figure 5:
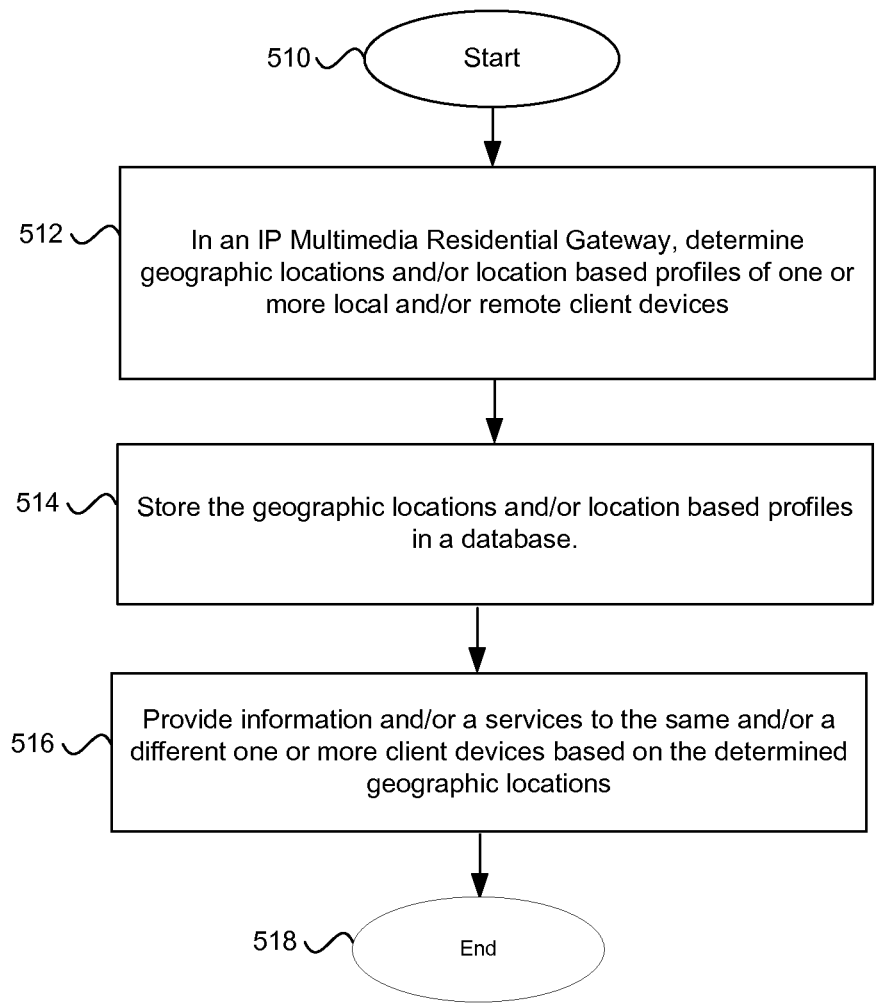
FIG. 5 is a flow chart illustrating exemplary steps that may be performed by an IP multimedia residential gateway (IMRG) for providing location aware tracking and/or services, in accordance with an embodiment of the invention.

FIG. 5 is a flow chart illustrating exemplary steps that may be performed by an IP multimedia residential gateway (IMRG) for providing location aware tracking and/or services, in accordance with an embodiment of the invention. Referring to FIG. 5, the exemplary steps may begin at step 510. In step 512, an IP multimedia residential gateway (IMRG), for example, the IMRG 112 may determine geographic locations of one or more local and/or remote client devices, for example, the client devices 132d and 138c. In this regard, the client devices may be operable to communicate their locations to the IMRG 112. The IMRG 112 may communicate the geographic locations to a service provider device. The IMRG 112 may receive location based profiles for use in providing services to the client devices 132d and 138c from the service provider. In step 514, the IMRG 112 may store the geographic locations and/or the location based profiles in a database, for example, a database such as the IMRG database storage 208. In step 516, based on the determined geographic locations, the IMRG 112 may provide information and/or services to the client devices 132d and/or 138c and/or to one or more different client devices, such as the client devices 132, 134, 136 and/or 138 and/or a client device such as the video client device 444. For example, the IMRG 112 may communicate the location information of the client devices 132d and/or 138c to the client devices 132, 134, 136 and/or 138 and/or to the video client device 444 to be displayed on a video screen. In another exemplary embodiment of the invention, the IMRG 112 may provide location sensitive content to the client devices 132d and/or 138c based on their determined location information. In another exemplary embodiment of the invention, the IMRG 112 may be operable to detect cloned client devices based on the location information of the client devices 132d and 138c. For example, the client device 138c may be a cloned version of the client device 132d and may be operable to access the IMRG 112 utilizing the same security credentials that are utilized by the client device 132d. Based on a location based profile of the client device 132d, the IMRG 112 may determine that client device 132*d* is currently located in a residence and/or at a location that is associated with an authentic subscriber of a security service and owner of the client device 132*d*. The IMRG 112 may determine that the client device 138*c* is a clone because it is located in place where is not associated with the authentic subscriber.

In an embodiment of the invention, in an IP multimedia gateway, for example, in the IMRG 112, a location corresponding with one or more of a plurality of communication devices, for example, the client devices 132*d* and/or 138*c*, which are communicatively coupled to the IP multimedia gateway 112, may be determined. The determined corresponding locations may be transmitted to one or more service provider devices, for example that may comprise one or more of the IP based application servers 150. The service provider devices may be operable to provide services to one or more of the plurality of communication devices 132*d* and/or comprise one or more of the broadband IP networks 120 and/or one or more of 138*c*. Location based service profiles may be received from the one or more service provider devices. The received location based service profiles may be generated by one or more service provider devices based on the determined corresponding location. Content for services provided by the one or more service provider devices may be communicated with the one or more of the plurality of communication devices 132*d* and/or 138*c* and/or with the one or more service provider devices based on the received location based service profiles. The corresponding location for one or more of the plurality of communication devices 132*d* and/or 138*c* may be determined based on location information received from the one or more of the plurality of communication devices 132*d* and/or 138*c* respectively. Each of the plurality of communication devices 132, 134, 136 and/or 138 that are communicatively coupled to the IP multimedia gateway may be local with respect to the IP multimedia gateway 112 or may be remote with respect to the IP multimedia gateway 112. A map of the determined corresponding locations of one or more of the plurality of communication devices, for example, 132*d* and/or 138*c*, may be generated for display by one or more of the plurality of communication devices 132, 134, 136 and/or 138. The IP multimedia gateway 112 may be integrated in a set-top-box, a digital television or a video projector, for example, the STB/DTV 440. A first communication device of the one or more of the plurality of communication devices, for example, a communication device similar to the client device 444, may comprise a video communication device, that may be integrated in the set-top-box, the digital television or the video projector such as the STB/DTV 440. The first communication device, the may be operable to display the determined corresponding location information for one or more other of the one or more of the plurality of communication devices 132, 134, 136 and/or 138. Content may be communicated to one or more of the plurality of communication devices 132, 134, 136 and/or 138 wherein the content may be determined based on the determined corresponding location of the one or more of the plurality of communication devices 132, 134, 136 and/or 138. Content and/or control information that may be received from the service provider devices may be utilized for communicating the content for the services. In a storage device, such as the IMRG data base storage 208, one or more locations may be associated with one or more of the plurality of communication devices, for example the communication device 132*d*. A cloned communication device, for example, the communication device 138*c*, may be detected when a determined corresponding location for the communication device 138*c* is different than the associated one or more locations. Furthermore, services to one or more of the plurality of communication devices 132, 134, 136 and/or 138 may be restricted based on the associated locations. In this manner, the communication devices 132, 134, 136 and/or 138 may be tracked by the IP multimedia gateway 112 and/or may receive services from the IP multimedia gateway 112 based on the location of the communication devices 132, 134, 136 and/or 138.

In another embodiment of the invention, an IP multimedia residential gateway device (IMRG) 112 may determine one or more locations of one or more client devices, for example, the client devices 132*d* and/or 138*c*. Information regarding the determined one or more locations may be stored in a database, for example, a database in the IMRG 112 such as the IMRG database storage 208. One or both of the location information and services may be provided to one or more client devices, for example, the client devices 132*d* and/or 138*c* and/or to one or more other client devices such as the client devices 132, 134, 136, 138 and/or the video client device 444, based on the determined one or more locations. The one or more locations may be determined based on location information that may be received from the one or more client devices, for example, from the client devices 132*d* and/or 138*c*. The one or more client devices and the one or more other client devices may be local client devices and/or remote client devices. A map of the determined one or more locations may be generated to be displayed by the one or more client devices, for example, the client devices 132*d* and/or 138*c* and/or by the one or more other client devices, for example, the client devices 132, 134, 136, 138 and/or the video client device 444.

The IMRG 112 or the IMRG 442 may be integrated in a set-top-box, a digital television or a video projector, for example, in the STB/DTV 440. The one or more other client devices may comprise the video client device 444 that may also be integrated in the set-top-box, the digital television or the video projector, for example, the STB/DTV 440 which may be operable to display the location information. Content may be communicated to the one or more client devices, for example, the client devices 132*d* and/or 138*c*, wherein the content may be determined based on the determined locations for each of the one or more client devices 132*d* and/or 138*c*. Content and/or control information received from service provider devices, for example, via the broadband IP networks 120, may be utilized by the IMRG 112 for providing the location information and services to the one or more client devices 132*d* and/or 138*c* and/or to the one or more other client devices 132, 134, 136, 138 and/or the video client device 444. One or more locations may be associated with ones of the one or more client devices, for example, the client devices 132*d* and/or 138*c*. A cloned client device may be detected when one of the one or more determined locations is different than the associated locations for one of the one or more client devices, for example, the client device 138*c*. In this manner, tracking of a client device by the IMRG 112 and/or services provided to a client device by the IMRG 112, may be determined based on the location of the client device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing location aware tracking and services via an IP multimedia residential gateway.

Accordingly, the present invention may be realized in hardware, software, or a combination of hardware and software.

The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    determining, by an intermediary for connecting a communication device to a network, a location corresponding to the communication device that is communicatively coupled to the intermediary based at least in part on whether the communication device is in a local location or a remote location relative to the intermediary;
    transmitting the location to a service provider;
    receiving, by the intermediary, a location based service profile from the service provider associated with the communication device, the location based service profile determined according to the location; and
    communicating, by the intermediary, content to the communication device according to the location based service profile, wherein the intermediary determines to switch protocols between local and remote communication protocols depending on the communication device being in a local or remote location relative to the intermediary, communicating the content to the communication device utilizing the determined protocol.

2. The method of claim 1, further comprising:
    receiving location information from the communication device; and
    wherein determining the location is based on the received location information.

3. The method of claim 1, wherein the intermediary is a device selected from the group consisting of:
    a set-top box;
    a digital television; and
    a video projector.

4. The method of claim 1, wherein the location based service profile comprises information about at least one of a user service agreement with the service provider, or access permissions to service and/or content, according to the location.

5. The method of claim 1, further comprising:
    receiving control information from the service provider, wherein communicating content to the communication device is further based on the control information from the service provider.

6. The method of claim 1, further comprising:
    detecting a cloned communication device, the cloned communication device having a different location; and
    restricting access to the cloned communication device.

7. The method of claim 1, wherein communicating content to the communication device based on the location based service profiles comprises conveying a geographical map with the location to the communication device.

8. An intermediary configured to connect a communication device to a network, comprising:
    a processor configured to determine a location corresponding to the communication device that is communicatively coupled to the intermediary based at least in part on whether the communication device is in a local location or a remote location relative to the intermediary; and
    a modem configured to transmit the location to a service provider, the modem further configured to receive a location based service profile from the service provider, the location based service profile determined according to the location, the modem further configured to communicate content to the communication device based on the location based service profiles, wherein the intermediary is configured to determine to switch protocols between local and remote communication protocols depending on the communication device being in a local or remote location relative to the intermediary, communicating the content to the communication device utilizing the determined protocol.

9. The intermediary of claim 8, the modem further configured to receive location information from the communication device, wherein the location is determined based on the received location information.

10. The intermediary of claim 8, wherein the intermediary is a device selected from the group consisting of:
    a set-top box;
    a digital television; and
    a video projector.

11. The intermediary of claim 8, wherein the content is determined based on the location.

12. The intermediary of claim 8, the modem further configured to receive control information from the service provider, wherein the communication of the content to the communication device is further based on the control information from the service provider.

13. The intermediary of claim 8, the processor further configured to detect a cloned communication device, the cloned communication device having a different location, the processor further configured to restrict access to the cloned communication device.

14. The intermediary of claim 8, wherein the modem comprises a multi-standard modem configured to communicate with the communication device.

15. The intermediary of claim 8, wherein the modem comprises a broadband modem configured to communicate with the service provider.

16. The intermediary of claim 8, wherein the processor is further configured to generate a map with the location.

17. A non-transitory computer-readable medium embodying a program executable in an intermediary configured to connect a communication device to a network, comprising code that, when executed, causes the intermediary to:
  determine a location of the communication device communicatively coupled to the intermediary using location data obtained by the communication device and whether the communication device is in a local location or a remote location relative to the intermediary;
  transmit the location to a service provider device in communication with the intermediary;
  receive a location based service profile from the service provider device, the location based service profile determined by the service provider device based at least in part on the location of the communication device; and
  communicate content to the communication device based at least in part on the location based service profile, the content configured to be rendered on the communication device, wherein the intermediary is configured to determine to switch protocols between local and remote communication protocols depending on the communication device being in a local or remote location relative to the intermediary, communicating the content to the communication device utilizing the determined protocol.

18. The non-transitory computer-readable medium of claim 17, wherein the program further comprises code that, when executed, causes the intermediary to generate a geographical map with the location of the communication device.

19. The non-transitory computer-readable medium of claim 17, wherein the program further comprises code that, when executed, causes the intermediary to:
  receive control information from the service provider device; and
  communicate content to the communication device based at least in part on the control information received from the service provider device.

20. The non-transitory computer-readable medium of claim 17, wherein the program further comprises code that, when executed, causes the intermediary to:
  detect a cloned communication device, the cloned communication device having a different location other than a stored location previously stored in association with the communication device in memory; and
  restrict access to the content by the cloned communication device.

* * * * *